US005800768A

United States Patent [19]

Kim et al.

[11] Patent Number: 5,800,768

[45] Date of Patent: Sep. 1, 1998

[54] METHOD FOR THERMALLY TREATING ELECTROCONDUCTIVE POLYMERIC PYROGEN

[76] Inventors: Tae Min Kim, 103-904 Dae Woo Apt. Anyang-2 dong, Anyang-City, Kyung Gi-do; Hyun Suk Kim, 104-4 Godung-dong, Kwonsun-ku, Suwon-City, Kyung Gi-do, both of Rep. of Korea

[21] Appl. No.: 585,487

[22] Filed: Jan. 16, 1996

[30] Foreign Application Priority Data

Feb. 8, 1995 [KR] Rep. of Korea ........................ 95-2210

[51] Int. Cl.$^{6}$ .................................................... B29C 35/02

[52] U.S. Cl. .......................... 264/450; 264/452; 264/477; 264/105; 264/235; 264/346

[58] Field of Search .................................... 264/450, 105, 264/452, 477, 235, 346

[56] References Cited

U.S. PATENT DOCUMENTS

| | | | |
|---|---|---|---|
| 2,324,644 | 7/1943 | Powell et al. | 264/450 |
| 3,503,823 | 3/1970 | Richart et al. | 156/244 |
| 3,823,217 | 7/1974 | Kampe | 264/105 |
| 4,426,339 | 1/1984 | Kamath et al. | 264/105 |

FOREIGN PATENT DOCUMENTS

| | | | |
|---|---|---|---|
| 828334 | 2/1960 | United Kingdom | 264/540 |

*Primary Examiner*—James Derrington

*Attorney, Agent, or Firm*—Hoffmann & Baron, LLP

[57] ABSTRACT

A method for the thermal treatment of an electroconductive polymeric pyrogen in which two parallel conductors are incorporated and electroconductive carbon black is dispersed in an insulating polymer, comprising the step of heating the pyrogen in an oven simultaneously while applying an electric field to the pyrogen through a lid line connected from the two conductors to an external power source, by which a desired final resistance can be obtained in a far shorter time while preventing the polymer from being degraded.

10 Claims, 3 Drawing Sheets

METHOD FOR THERMALLY TREATING ELECTROCONDUCTIVE POLYMERIC PYROGEN

BACKGROUND OF THE INVENTION

1. Field of the Invention

The present invention relates in general to a method for thermally treating electroconductive polymeric pyrogens and, more particularly, to an improvement in such a method for remarkably reducing the thermal treatment time by applying an external electric field to a pyrogen which is heated to its melting point.

2. Description of the Prior Art

Electroconductive polymeric pyrogens, which are generally formed by incorporating carbon black in polymers, take advantage of the positive temperature coefficient of the dispersed electroconductive media, carbon black, which has a resistance that varies to the positive direction depending on the temperature. Based on this fact, that is, the resistances of such pyrogens vary by themselves depending on ambient temperatures and the caloric values, thus, are controlled spontaneously, they can be applied for automatic temperature control of an object without additional controllers by electrically conducting them through at least two electrodes.

A typical method for producing a self-regulative pyrogen is composed mainly of a mixing process for incorporating melted carbon black in a polymer, a pyrogen extruding process for mounting two electrodes through which electric fields are applied, an insulator extruding process on pyrogen, optionally a thermal treatment process according to electroconductive polymer components, and a crosslinking process (mainly by irradiating beams) of electroconductive polymeric pyrogen for preventing the resistance drop of polymer, occurring at its melting point or higher and known as a negative temperature coefficient, which is a dangerous factor capable of generating fire in practice.

A significant disadvantage of the conventional method for producing a pyrogen is that a large quantity of carbon black is required in order to obtain an appropriate resistance range applicable for pyrogenic articles (about 6–100,000 ohm cm) because the electroconductive structure of carbon black (carbon black agglomerates playing a role of electroconductive passage in polymer) is broken by the shear stress which is applied to the polymer at the mixing process. The use of a large quantity of carbon black deleteriously affects not only the workability for the mixing process but also causes the polymer to be excessively cured so that the extruded pyrogen may be poor in flexibility. In addition, it is difficult to guarantee the output stability of the final pyrogenic articles containing a large quantity of carbon black.

Therefore, a novel thermal treatment of pyrogen by which a resistance range applicable for article can be obtained with as little carbon black as possible has been researched.

At the thermal treatment process of the above-mentioned method, polymer is exposed to its melting point temperature or higher for a predetermined time, with the aim of recovering the electroconductive structure of carbon black in the melted electroconductive polymer. In detail, the pyrogen is exposed to high temperatures for long periods, i.e. 10 hours or longer, in order to recover the electroconductive structure of carbon black and to allow the pyrogen to have an appropriate resistance range upon cooling, and the thermal treatment process may be carried out after a shape retaining jacket, a primary thermal insulator with a melting point higher than that of the pyrogen, is extruded on the pyrogen.

However, this thermal treatment has a significant disadvantage of having a difficult managing process because the time of thermal treatment taken to decrease the resistance of pyrogen sufficiently is too long relative to those of pre- and post thermal treatments. In addition, the exposure of electroconductive polymer to high temperature for long periods cause a significant degradation, which is an inhibitory factor against long-term stability of output of the final pyrogenic articles.

SUMMARY OF THE INVENTION

Therefore, it is an object of the present invention to overcome the above problems encountered in prior arts and to provide a method for thermally treating electroconductive polymeric pyrogens by which a desired final resistance can be obtained in a far shorter time.

It is another object of the present invention to provide a method for thermally treating electroconductive polymeric pyrogens, which prevents the degradation of the polymer.

Based on the intensive and thorough research by the present inventors, the above objects could be accomplished by a provision of a method for the thermal treatment of an electroconductive polymeric pyrogen in which two parallel conductors are incorporated and electroconductive carbon black is dispersed in an insulating polymer, which comprises heating the pyrogen in an oven simultaneously while applying an electric field to the pyrogen through a lid line connected from the two conductors to an external power source.

BRIEF DESCRIPTION OF THE DRAWINGS

The above objects and other advantages of the present invention will become more apparent by describing in detail the preferred embodiments of the present invention with reference to the attached drawings in which.

DETAILED DESCRIPTION OF THE INVENTION

Figure 1:
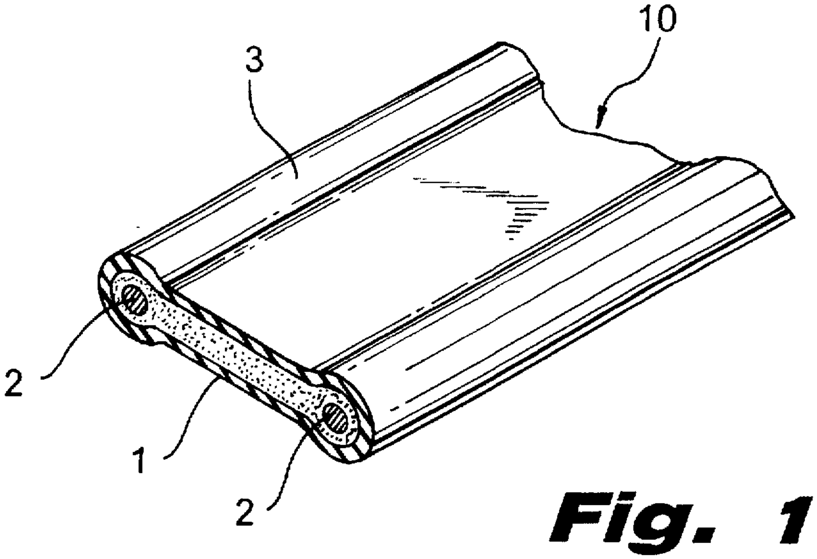
FIG. 1 is a perspective view showing an electroconductive polymeric pyrogen according to the present invention.

The application of the preferred embodiments of the present invention is best understood with reference to the accompanying drawings, wherein like reference numerals are used for like and corresponding parts, respectively.

Referring to FIG. 1, an electroconductive polymer pyrogen of the present invention in perspective view is shown. As shown in this figure, the electroconductive polymer pyrogen 10 is of self-regulation and line type and comprises two conductors 2 running parallel to each other, an extruded electroconductive polymer pyrogen 1 encompassing and interconnecting the two conductors 2 and an insulating sheath 3 coated on the pyrogen 1.

Figure 2:
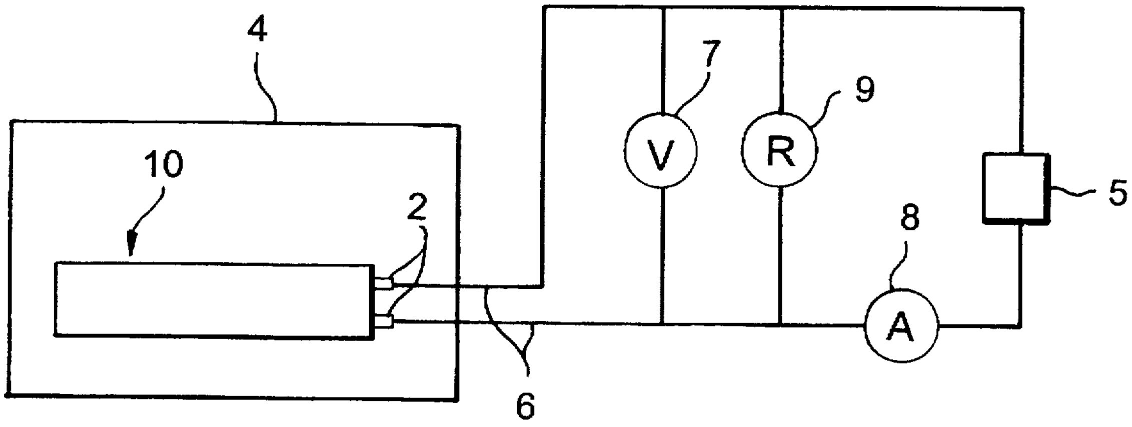
FIG. 2 is a circuit diagram illustrating a thermal treatment method according to a first preferred embodiment of the present invention.

With reference to FIG. 2, there is a circuit diagram showing a thermal treatment according to a first preferred embodiment of the present invention. In this embodiment, the self-regulative line type pyrogen 10 of FIG. 1 is placed in a heating oven 4 and two conductors 2 protruded from one end of the pyrogen 10 each are connected with a power source 5 by extending them through a lid line 6 which diverges into several lines to set a voltmeter 7, an amperemeter 8 and a resistance meter 9, by which applied voltage, current and resistance of pyrogen are measured, respectively.

Figure 3:
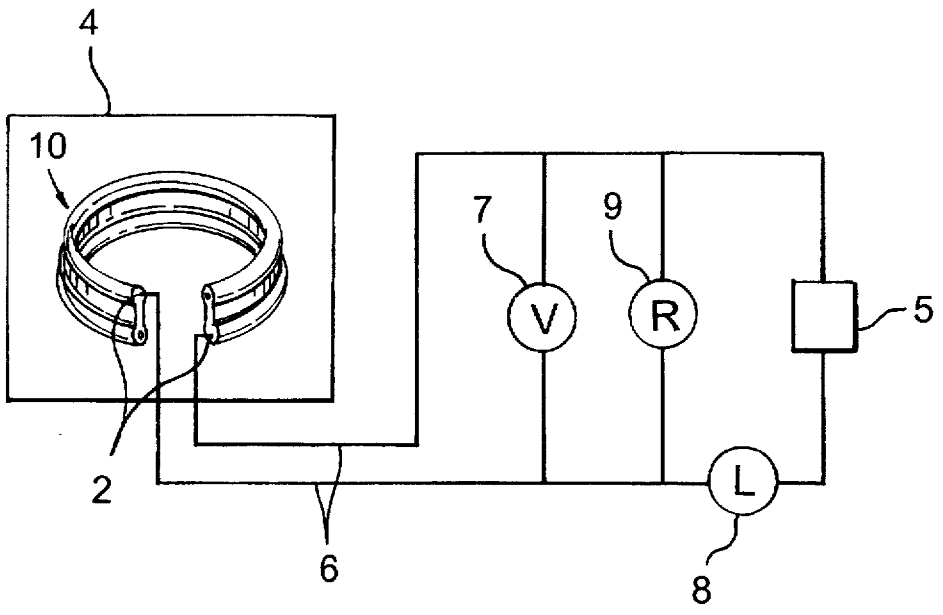
FIG. 3 is a circuit diagram illustrating a thermal treatment method according to a second preferred embodiment of the present invention.
Figure 4:
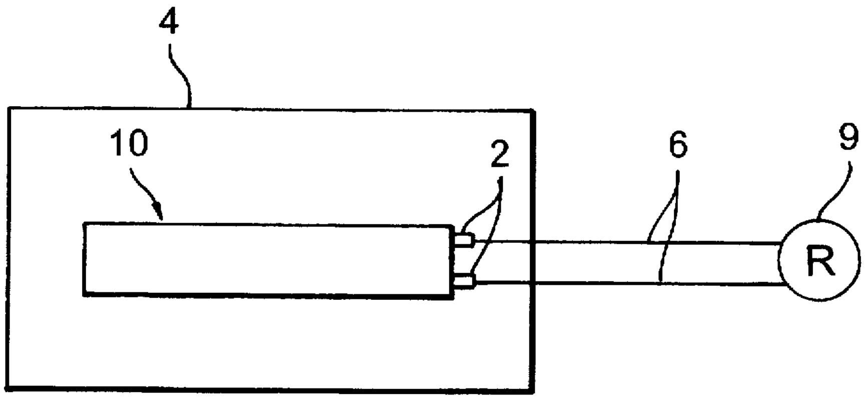
FIG. 4 is a circuit diagram illustrating a conventional thermal treatment method.

FIG. 3 schematically shows a thermal treatment method according to a second preferred embodiment of the present invention. When a line-type pyrogen 10 is long, if the method of FIG. 2 is applied for it, an unbalance of self pyrogenesis in the line-type pyrogen 10 would occur by length because voltage drops by length, which results in a resistance deviation in the length direction. In order to prevent a resistance deviation, as shown in FIG. 3, two conductors 2, each protruded from an opposite end of the pyrogen 10, are connected with a power source 5 by extending them through a lid line 6 which diverges into several lines to set a voltmeter 7, an amperemeter 8 and a resistance meter 9, by which applied voltage, current and the resistance of a semiconductor are measured, respectively.

In the second embodiment of the present invention, resin which constitutes the pyrogen with a positive temperature coefficient is an important factor for determining the temperature of the thermal treatment, e.g. higher or lower temperature than the melting point of the resin. To effect the thermal treatment, for example, polyolefinic resins (i.e. polyolefins or polyolefinic derivatives) are subjected to an oven with temperatures of not less than their melting points. On the other hand, where PVDF, a fluoride resin, is used, the temperature of the oven is maintained at no higher than the melting point of the resin.

In the mixing process of pyrogen, if the resistance of a pyrogen incorporated with a considerable quantity of electroconductive carbon black is not so high before thermal treatment, it may be treated at lower temperatures than the melting point of its resin.

Where a pyrogen is applied with 220 V or higher for at least 30 seconds from a high voltage external power source and a maximum of current is not less than 5A, an overcurrent flows in the pyrogen upon thermal treatment because its resistance is reduced in sequence, which causes a steep increase of the temperature therein, leading to burning.

At an early stage of the thermal treatment, high voltage and current can be applied because a pyrogen shows high resistance. In the middle of the thermal treatment in which the resistance of pyrogen is reduced, voltage applied from an external power source is below 220 V and preferably not more than 110 V with a maximum current of less than 5 A and preferably not more than 3 A. Such power source is applied for less than 30 seconds and preferably for less than 5 seconds.

One or more different polymers may be used as a base for the pyrogen of the present invention in which carbon black with a particle size of about 20 to 150 nm is incorporated.

In accordance with the present invention, at least one round of thermal treatment is effected as an external power source.

Following is the effect of the thermal treatment in accordance with the present invention.

First, the final resistance of pyrogen which has been obtained by being exposed to higher temperatures than its melting point for long periods can be accomplished in a far shorter time by applying an electric field to a melted pyrogen to induce self pyrogenesis and thus, accelerate resistance drop.

Second, the temperature increase of pyrogen which is caused by the self pyrogenesis owing to the application of the power source can be controlled by limiting the time or power when applying an electric field, thereby restraining the deterioration of electroconductive polymer.

A better understanding of the present invention may be obtained in light of following examples which are set forth to illustrate, but are not to be construed to limit, the present invention.

In the following Example and Comparative Example, a resin which was formulated with 78:22 high density polyethylene (melting point: about 129° C.): ethylene ethyl acrylate (melting point: 91° C.) was kneaded together with 18 phr carbon black (Vulcan XC-72, cabot) and 1 phr antioxidant (Irganox 1010) in a banbury mixer for 5 min and then, pelletized to yield an electroconductive polymer compound. This was extruded for two nickel-plated copper lines (7/045AWG, Class II), to give an electroconductive polymer pyrogen which was 0.15 cm thick at the center and in which the two conductors were 0.6 cm spaced from center to center. Thereafter, an insulating sheath of thermoplastic polymer was coated on the pyrogen.

EXAMPLE I

After being connected with various measuring meters as shown in FIG. 3, a pyrogen 3 m long was placed in a heating oven which was set near the melting point of the resin (130±2° C.). The thermal treatment of the present invention was effected by electric field which was applied every 5 minutes after 20 minutes since stabilization of temperature of the oven. During such thermal treatment, voltage, current and resistance of the pyrogen were measured. Thereafter, a measurement was taken for resistance of the pyrogen just after cooling.

COMPARATIVE EXAMPLE I

A pyrogen 3 m long was placed in an oven and thermally treated at a temperature of 150±3° C. During this treatment, a measurement was taken to determine how the resistance of the pyrogen was changed. After being cooled, the pyrogen was tested for resistance.

The pyrogens thermally treated in Example and Comparative Example were subjected to light-crosslinking so that the electroconductive polymer had a gel content ranging from 60 to 65% in each of them. The final articles thus obtained were tested for long-term stability as follows:

1) Thermal Stability Test

The pyrogen articles were aged in an oven maintained at 85° C. for 7 days (168 hrs). Just before and after the ageing, they were tested for 10° C. resistance and output (220 V) in an incubator.

2) Voltage Stability Test

The pyrogen articles were applied with 480 V for 72 hrs. Just before and after the application, they were tested for 10° C. resistance and output (220 V) in an incubator.

Figure 5:
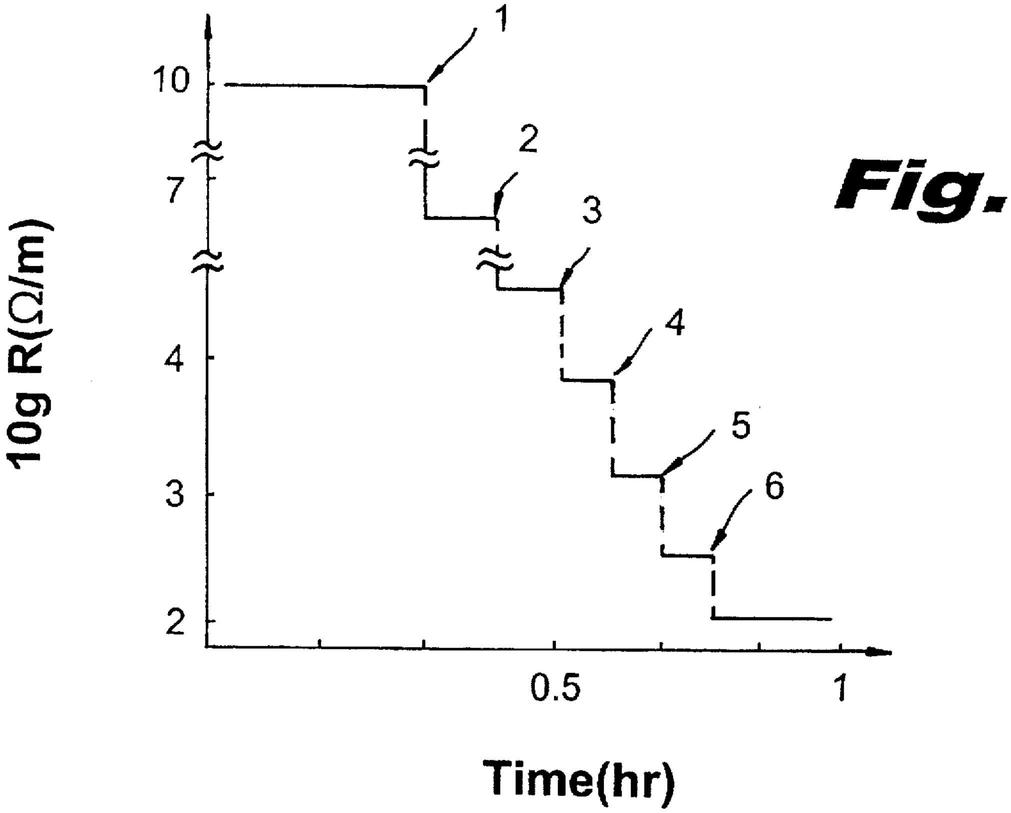
FIG. 5 shows the decrease of resistance in a pyrogen according to the thermal treatment method of the present invention.
Figure 6:
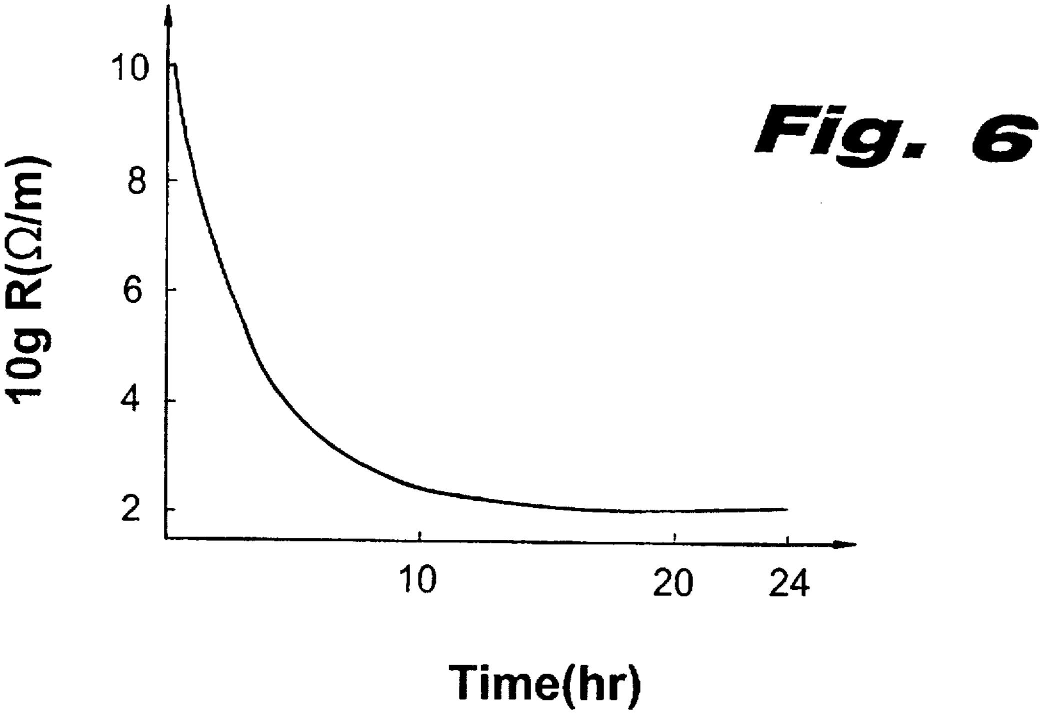
FIG. 6 shows the decrease of resistance in a pyrogen according to the conventional thermal treatment method.

The results of these tests for the pyrogens of Example and Comparative Example were shown in FIGS. 5 and 6 and Tables 1 to 3.

Referring to FIG. 5, there are plotted resistances of a pyrogen during the thermal treatment of the present invention with regard to times. FIG. 6 shows the conventional thermal treatment. As apparent from these figures, it takes a far shorter time for the pyrogen of the present invention than the conventional pyrogen to have the same resistance. This is well summarized in Table 2 below.

The results of FIG. 5 is numerically expressed in Table 1 below. As indicated in Table 1, the resistance of pyrogen is reduced in a large extent by short-time application of electric field.

TABLE 1

Variation of Resistances upon Thermal Treatment

| Power Appl'n Point | Time (sec) | Potential (Volt) | Maximum Current (Ampere) | Resistance (ohm/m) Before appl'n | After appl'n |
|---|---|---|---|---|---|
| 1 | 10 | 220 | 0.9 | $>10^8$ | $1.8 \times 10^8$ |
| 2 | 10 | 220 | 1.5 | $1.6 \times 10^8$ | $1.9 \times 10^8$ |
| 3 | 5 | 220 | 2.3 | $1.8 \times 10^4$ | $1.9 \times 10^3$ |
| 4 | 5 | 220 | 4.7 | $1.9 \times 10^3$ | $1.1 \times 10^3$ |
| 5 | 5 | 220 | 5.2 | $1.1 \times 10^3$ | $1.6 \times 10^2$ |
| 6 | 5 | 220 | 6.3 | $1.5 \times 10^2$ | $1.1 \times 10^2$ |

* Resistance values written are values per meter which are converted from the measured ones for a pyrogen 3 m long.

TABLE 2

Variation of Resistances upon Thermal Treatment

| (sec) | Minimal Resist. Upon Thermal Treatment (ohm/m) | 10° C. Resist. After Cooling (ohm/m) | Total Thermal Treatment Time |
|---|---|---|---|
| Example | $1.1 \times 10^2$ | $1.23 \times 10^3$ | <1 hr |
| C. Example | $1.0 \times 10^2$ | $1.19 \times 10^3$ | >24 hrs |

* Resistance values written are values per meter which are converted from the measured ones for a pyrogen 3 m long.

In Table 3 below, the results for long-term stability and voltage stability are given. As apparent from the table, the pyrogen articles of the present invention are superior in thermal and voltage stability, demonstrating that the thermal treatment according to the present invention can significantly improve long-term stability.

TABLE 3

Thermal and Voltage Stability Tests

| | Thermal Stability Test | | | | Voltage Stability Test | | | |
|---|---|---|---|---|---|---|---|---|
| | Before Aging | | After Aging | | Before Power | | After Power | |
| | Resis. (ohm) | Output (Watt) | Resis. (ohm) | Output (Watt) | Resis. (ohm) | Output (Watt) | Resis. (ohm) | Output (Watt) |
| Exam | 1230 | 12.4 | 1230 | 12.4 | 1230 | 12.4 | 1220 | 12.5 |
| C. Exam | 1190 | 12.1 | 1850 | 9.3 | 1190 | 12.1 | 1980 | 8.9 |

* Resistance and output values written are values per meter which are converted from the measured ones for a pyrogen 3 m long.

Other features, advantages and embodiments of the present invention disclosed herein will be readily apparent to those exercising ordinary skill after reading the foregoing disclosures. In this regard, while specific embodiments of the invention have been described in considerable detail, variations and modifications of these embodiments can be effected without departing from the spirit and scope of the invention as described and claimed.

What is claimed is:

1. A method for the thermal treatment of an electroconductive polymeric, self-regulating pyrogen in which at least two parallel conductors are incorporated and electroconductive carbon black is dispersed in an insulating polymer interposed between said at least two parallel conductors, which comprises heating said pyrogen in an oven while simultaneously applying an electric field to said pyrogen through a lid line connected from said two parallel conductors to an external power source, such that current passes between said at least two parallel conductors through said insulating polymer thereby inducing self-pyrogenesis into said pyrogen, wherein the application of the electric field is repeated at least twice, the heating in an oven is performed near the melting temperature of said insulating polymer for a time of one hour or less.

2. A method in accordance with claim 1, wherein said insulating polymer is of fluoride resin and said pyrogen is heated at a temperature of not higher than the melting point of said fluoride resin in said oven.

3. A method in accordance with claim 1, wherein said insulating polymer is of polyolefinic resin and said pyrogen is heated at a temperature of not lower than the melting point of said polyolefinic resin.

4. A method in accordance with claim 1, wherein said two conductors are connected with said power source by extending each of them from the opposite ends of said pyrogen.

5. A method in accordance with claim 1, wherein said two conductors are connected with said power source by extending both of them from one end of said pyrogen.

6. A method in accordance with claim 1, wherein said insulating polymer is selected from the group consisting of polyolefin, olefinic derivatives, and fluoride resins.

7. A method in accordance with claim 1, wherein said electroconductive carbon black has a particle size ranging from about 20 to 150 nm.

8. A method in accordance with claim 1, wherein said insulating polymer is formed of at least two different polymers.

9. A method in accordance with claim 1, wherein said electroconductive polymeric pyrogen has a positive temperature coefficient.

10. A method for rapidly controlling the resistance of a self-regulating pyrogen including at least two parallel conductors, and an insulating polymer interposed between said at least two parallel conductors, said insulating polymer having electroconductive carbon black dispersed therein, said method comprising the following steps:

(i) inducing self-pyrogenesis into said pyrogen by applying an electric field through a lid line connected from said at least two parallel conductors to an external power source, such that current passes between said at least two parallel conductors through said insulating polymer; and (ii) applying external thermal heating to said pyrogen by heating in an oven; said first and second steps occurring simultaneously, wherein the application of the electric field is repeated at least twice, the heating in an oven is performed near the melttig tetmerature of said insulating polymer for a time of one hour or less.

* * * * *